(12) United States Patent
Rice et al.

(10) Patent No.: US 8,753,075 B2
(45) Date of Patent: Jun. 17, 2014

(54) FAN CASE ASSEMBLY AND METHOD

(75) Inventors: Edward Claude Rice, Indianapolis, IN (US); Daniel E. Molnar, Jr., Lebanon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 782 days.

(21) Appl. No.: 12/839,462

(22) Filed: Jul. 20, 2010

(65) Prior Publication Data
US 2012/0020782 A1 Jan. 26, 2012

(51) Int. Cl.
*F04D 29/44* (2006.01)
*F04D 29/54* (2006.01)

(52) U.S. Cl.
USPC ........................................ 415/190; 415/209.2

(58) Field of Classification Search
USPC ................ 415/189–190, 209.2–209.4, 210.1; 29/889.22, 889.2, 450, 453
See application file for complete search history.

(56) References Cited

U.S. PATENT DOCUMENTS

| | | | |
|---|---|---|---|
| 3,830,058 A | 8/1974 | Ainsworth | |
| 4,643,636 A * | 2/1987 | Libertini et al. | 415/138 |
| 5,161,947 A | 11/1992 | Eckfeldt et al. | |
| 5,226,789 A | 7/1993 | Donges | |
| 5,848,874 A * | 12/1998 | Heumann et al. | 415/189 |
| 6,547,518 B1 * | 4/2003 | Czachor et al. | 415/137 |
| 6,647,708 B2 | 11/2003 | Bornhoft et al. | |
| 7,076,942 B2 * | 7/2006 | Schreiber | 60/223 |
| 7,506,499 B2 | 3/2009 | Fert et al. | |
| 8,297,951 B2 * | 10/2012 | Peia | 417/423.14 |
| 2006/0059889 A1 * | 3/2006 | Cardarella | 60/226.1 |
| 2008/0010970 A1 | 1/2008 | Eleftheriou et al. | |

OTHER PUBLICATIONS

European Search Report and Examination Report; European Patent Office; European Application No. EP11250668.8 dated Nov. 18, 2013; 6 pages.

* cited by examiner

*Primary Examiner* — Edward Look
*Assistant Examiner* — Christopher J Hargitt
(74) *Attorney, Agent, or Firm* — Krieg DeVault LLP

(57) ABSTRACT

A method for suspending a fan case and a fan case assembly in which a fan case is suspended are disclosed herein. The fan case assembly includes an inner ring encircling an axis. The fan case assembly also includes a first outer ring encircling the axis and having an annular flange. The fan case assembly also includes a plurality of struts each extending radially outward from an inner end engaged with the inner ring to an outer end engaged with the first outer ring. The fan case assembly also includes a second outer ring abutting the first outer ring along the axis. The fan case assembly also includes a plurality of leaves each fixed to the second outer ring and extending along the axis. The leaves are slid over an outer surface of the first outer ring to engage the first and second outer rings together.

28 Claims, 3 Drawing Sheets

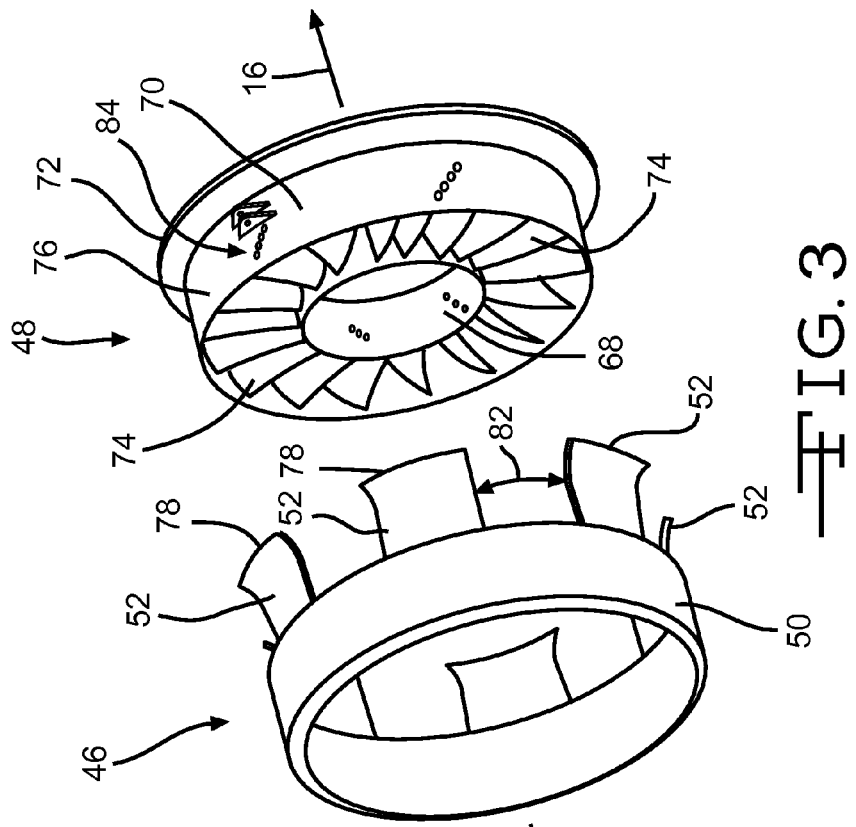
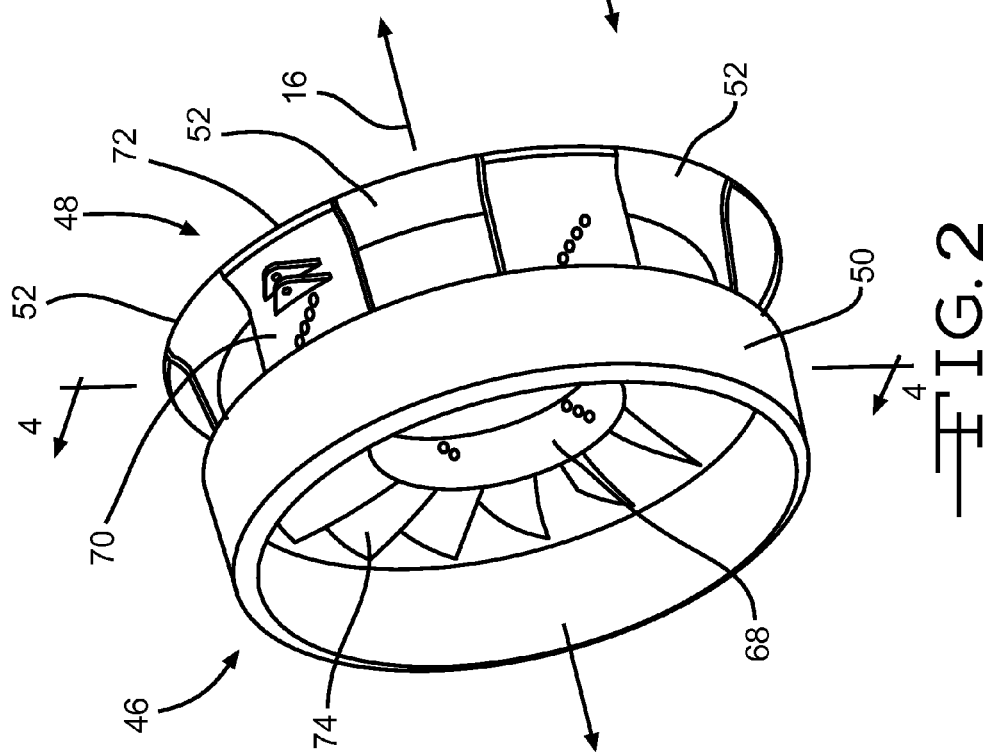

FAN CASE ASSEMBLY AND METHOD

BACKGROUND OF THE INVENTION

1. Field of the Invention

The invention relates to a case for encircling a fan such as in a turbine engine and a method for mounting the case.

2. Description of Related Prior Art

U.S. Pat. No. 5,161,947 discloses a fan case strut for a turbo-machine. An axial flow turbo-machine's engine core and radially outwardly disposed fan case are joined together with a radially extending segmented fan case strut. The strut is segmented into a radially inner portion and a radially outer portion at a "midspanly" disposed strut joint. The strut joint has an axially extending tapered tongue which slidably engages with a mating axially extending groove. A radially extending flange disposed proximate to the trailing edge of the inner portion is bolted to the radially extending flange disposed proximate to the trailing edge of the outward portion when the tongue is fully engaged with the groove to releasably secure the strut joint. Another embodiment shows a pair of interlocked axially extending channels each having a U-shaped cross-section replacing the interlocked tongue and groove of the first embodiment. Radially extending flanges disposed proximate to the portions' trailing edges are likewise bolted together to releasably secure the strut joint when the channels' three corresponding pairs of contact surfaces are fully slidably engaged.

SUMMARY OF THE INVENTION

In summary, the invention relates to suspending a fan case, such as by arranging a fan case assembly. The fan case assembly includes an inner ring encircling an axis. The fan case assembly also includes a first outer ring encircling the axis and having an annular flange. The fan case assembly also includes a plurality of struts each extending radially outward from an inner end engaged with the inner ring to an outer end engaged with the first outer ring. The fan case assembly also includes a second outer ring abutting the first outer ring along the axis. The fan case assembly also includes a plurality of leaves each fixed to the second outer ring and extending along the axis. The leaves are slid over an outer surface of the first outer ring to engage the first and second outer rings together.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a perspective view of an exemplary embodiment of the invention;

FIG. 3 is an exploded view of the exemplary embodiment of the invention shown in FIG. 2.

DETAILED DESCRIPTION OF AN EXEMPLARY EMBODIMENT

The invention, as demonstrated by the exemplary embodiment described below, provides an improved arrangement for mounting a fan case. The exemplary embodiment provides a more robust design. For example, in the event that a fan blade separates from an inner hub, the impact load applied to the fan case does not immediately affect a traditional bolted joint. Rather, the impact energy spreads out through the case before encountering a mounting flange that is relatively remote (aft of a front case as described below). The impact is therefore distributed over a much larger area of the mounting flange. The exemplary embodiment also represents a weight reduction. Two structures, the fan case and the front frame, can be mounted through a single set of bolts. Also, in the exemplary embodiment, a containment system, such as a Kevlar blanket, can be extended over the junction between the fan case and the front frame, where previously a bolted joint would be. This may allow for a decrease in distance between the fan and front frame thereby potentially reducing the overall engine weight.

It is noted that any benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiments and described herein are not limitations of the broader invention, but rather demonstrate industrial applicability of the invention through the exemplary embodiments.

Figure 1:
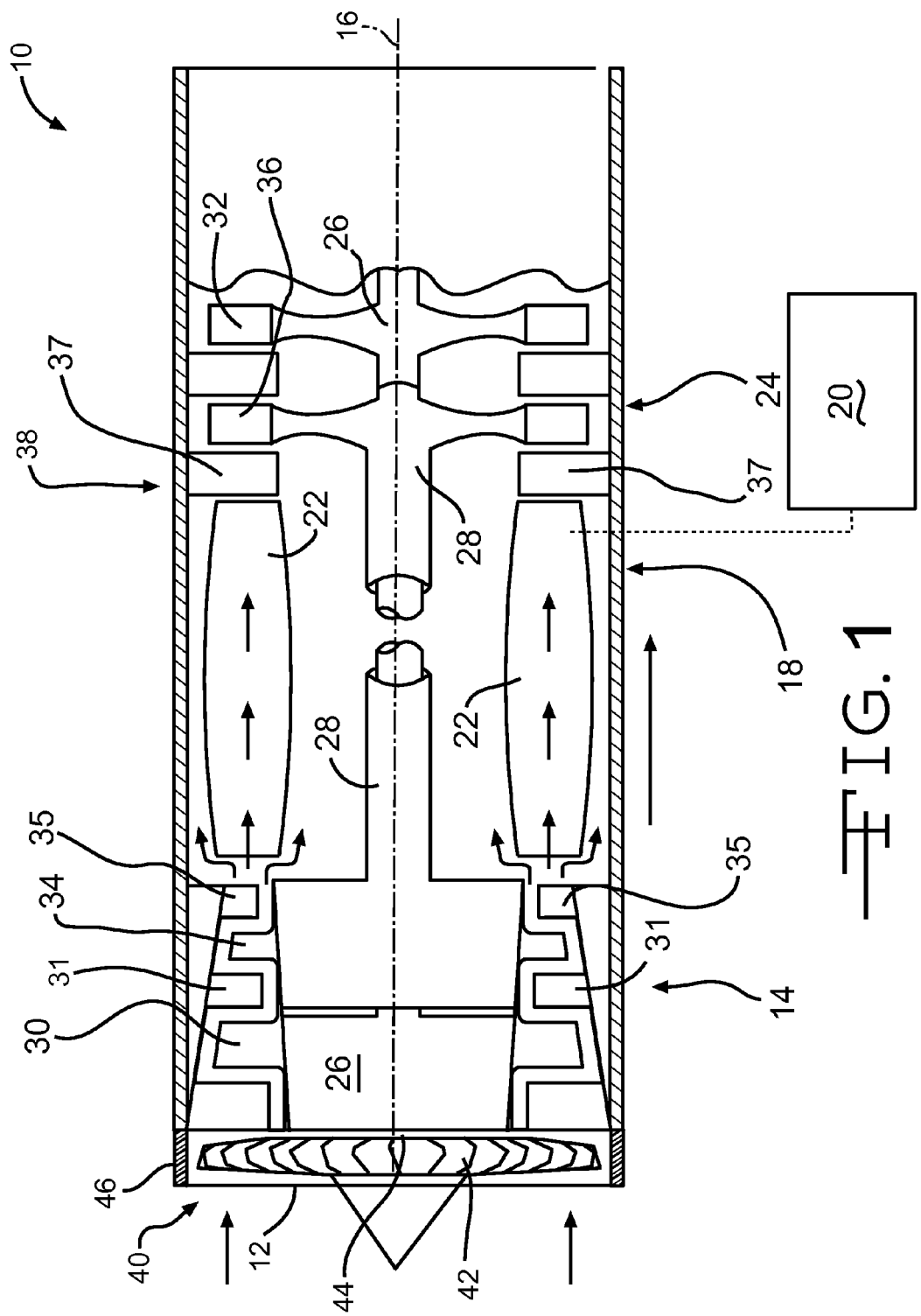
FIG. 1 is a schematic cross-section of a turbine engine incorporating an exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which inspection of difficult to access components is desired or required.

The exemplary turbine engine 10 can include an inlet 12 to receive fluid such as air. The turbine engine 10 can include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. A plurality of vanes 31 can be positioned to direct fluid downstream of the blades 30. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. A plurality of vanes 35 can be positioned to receive fluid from the blades 34. The shaft 28 can also support high pressure turbine blades 36 of a high pressure portion of the turbine section 24. A plurality of vanes 37 can be positioned to direct combustion gases over the blades 36.

The compressor section 14 can define a multi-stage compressor, as shown schematically in FIG. 1. A "stage" of the compressor section 14 can be defined as a pair of axially adjacent blades and vanes. For example, the vanes 31 and the blades 30 can define a first stage of the compressor section 14. The vanes 35 and the blades 34 can define a second stage of the compressor section 14. The invention can be practiced with a compressor having any number of stages.

A casing 38 defines a first wall and can be positioned to surround at least some of the components of the turbine engine 10. The exemplary casing 38 can encircle the compressor section 14, the combustor section 18, and the turbine section 24. In alternative embodiments of the invention, the casing 38 may encircle less than all of the compressor section 14, the combustor section 18, and the turbine section 24.

FIG. 1 shows the turbine engine 10 having a fan 40 positioned forward of the compressor section 14 along the centerline axis 16. The fan 40 can include a plurality of blades 42 extending radially outward from a hub 44. The fan 40 can be encircled by a fan case 46. The fan case 46 can be fixed to the casing 38. The casing 38 is shown schematically as being a single structure. In some embodiments of the invention, the casing 38 can be a single structure. In other embodiments of the invention, the casing 38 can be formed from a plurality of members that are fixed together. The forward-most member can be designated as a "front frame." The fan case 46 can be mounted to a front frame portion of the casing 38.

Figure 4:
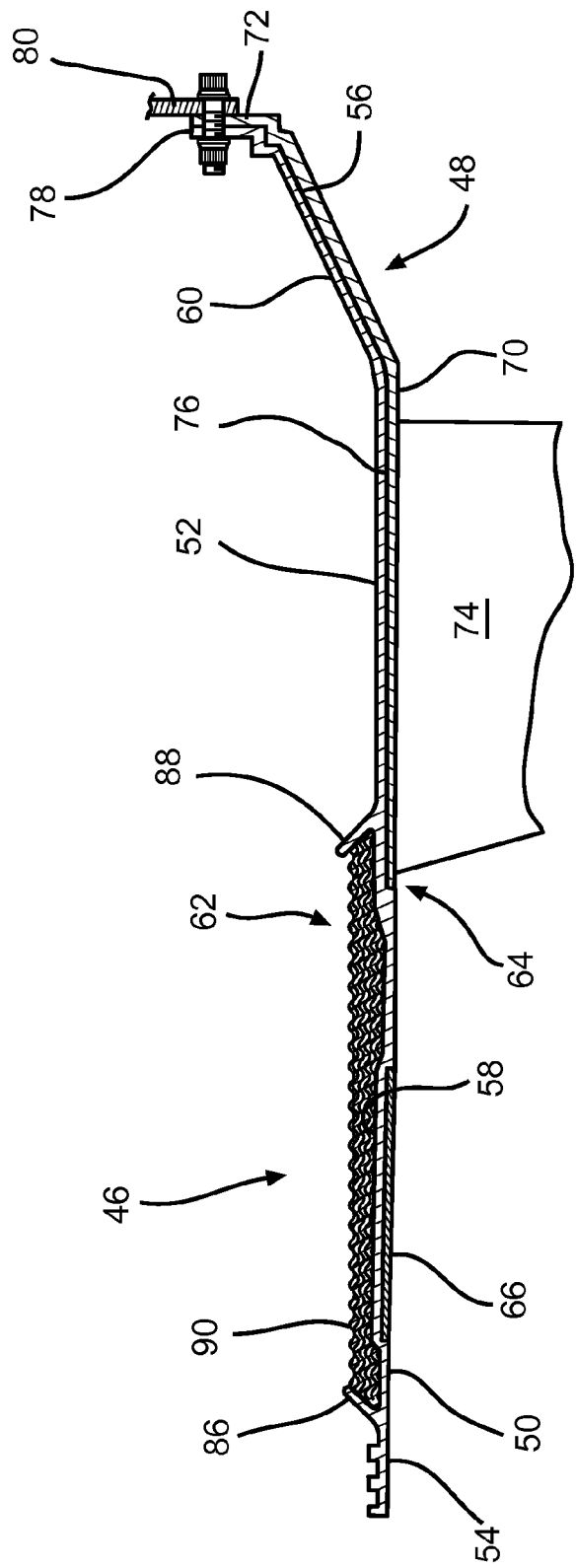
FIG. 4 is a partial cross-section taken through section lines 4-4 in FIG. 2.

FIGS. 2-4 show detailed views of an exemplary embodiment. A fan case 46 can be suspended from a front frame 48. The fan case 46 includes an outer ring or ring portion 50 centered on an axis. Upon assembly in a turbine engine for example, the ring portion 50 can be centered on the centerline axis 16 so this exemplary axis is shown in FIGS. 2-3. The fan case 46 also includes a plurality of leaves 52 that extend away from the ring portion 50 along the axis 16. The ring portion 50 and the plurality of leaves 52 can be integrally formed with respect to one another, such as through concurrent molding, and can be formed from a composite of materials to minimize weight.

FIG. 4 shows that the exemplary ring portion 50 and each of the plurality of leaves 52 define respective radial thicknesses between radially inner surfaces 54, 56 and radially outer surfaces 58, 60. The respective radial thicknesses of the ring portion 50 and the plurality of leaves 52 can be substantially similar to promote even curing after a molding process. FIG. 4 shows a transitional area 62 at a junction between the ring portion 50 and the leaves 52 as being slightly thicker to form a piloting feature 64, however the remainder of the fan case 46 has substantially the same thickness. It is noted that the fan case 46 can include a layer 66 of material that can be worn in by movement of the fan blades. For example, the fan blades can slightly penetrate this layer during rotation and thereby minimize the radial gap between the fan and the fan case 46.

Referring again to FIGS. 2 and 3, the front frame 48 can include an inner ring 68 and an outer ring 70, both encircling the axis 16. The front frame 48 can be formed from metal or any other material in view of the operating environment of the front frame 48. The outer ring 70 includes an annular flange 72 for mounting. The front frame 48 also includes a plurality of struts 74 each extending radially outward from an inner end engaged with the inner ring 68 to an outer end engaged with the outer ring 70.

During assembly of the fan case 46 and the front frame 48, the plurality of leaves 52 are slid over an outer surface 76 of the outer ring 70. The structures can be formed such that the leaves 52 become urged or biased radially outward during the sliding movement. In other words, the leaves 52 could be elastically deformed during assembly. Alternatively, the leaves 52 can be formed to correspond relatively precisely to the radially outer shape of the front frame 48 and therefore not be deformed during assembly. The fan case 46 and front frame 48 can be moved closer to one another until a forward end of the fan case 48 contacts the piloting feature 64 and the ring portion 50 abuts the outer ring 70 along the axis 16. At the same time, partially annular flanges 78 defined by at least some of the leaves 52 can abut the annular flange 72 of the outer ring 70. Fasteners can then be inserted through aligned apertures in the one or more flanges 78, the flange 72, and a flange 80 of a rigid structure of the turbine engine (shown in FIG. 4). The fan case 46 can thus be cantilevered off the front frame 48, as the plurality of leaves 52 are mounted or positioned to an axial side of the front frame 48 remote from the ring portion 50 (the aft side of the front frame 48). The ring portion 50 and outer ring 70 can cooperate to define a substantially continuous radially-inner surface for guiding fluid flow.

At least one gap 82 about the axis 16 can be formed between two of the plurality of leaves 52. A plurality of apertures, referenced at 84, can be position in the gap 82 and pass through the outer ring 70. The apertures 84 are thus exposed after the leaves 52 have been slid over the outer surface 76. At least one passageway (not visible) can communicate with the apertures 84 and extend through one or more of the plurality of struts 74. The apertures 84 can be an opening for the passageway and allow for the passage of electrical, lubricant, air, and/or other services.

As best shown in FIG. 4, in the exemplary embodiment, first and second projections 86, 88 can extend outward from the radially outer surface 58 of the ring portion 50. The first projection 86 can be spaced from the outer ring 70 along the axis 16 and the second projection 88 can overlap the outer ring 70 along the axis 16. A blanket 90, such as a Kevlar blanket, can be positioned between the first and second projections 86, 88 such that at least a portion of the blanket overlaps the outer ring 70 along the axis 16. The blanket 90 can be useful in preventing the escape of a fan blade that separates from the fan hub.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A fan case assembly comprising:
   an inner ring encircling an axis;
   a first outer ring encircling said axis and having an annular flange;
   a plurality of struts each extending radially outward from an inner end engaged with said inner ring to an outer end engaged with said first outer ring;
   a second outer ring abutting said first outer ring along said axis;
   a plurality of leaves each fixed to said second outer ring and extending along said axis, said leaves being slid over an outer surface of said first outer ring to engage said first and second outer rings together;
   wherein said first outer ring includes an outer surface extending along said axis and defining an axial side of said first outer ring; and
   wherein said plurality of leaves are engaged in abutment against said outer surface of said first outer ring and are mounted to said axial side of said first outer ring.

2. The fan case assembly of claim 1 wherein at least some of said leaves includes a partially annular flange, each of said partially annular flanges abutting said annular flange of said first outer ring after said leaves have been slid over said outer surface; and
   fastening means to fix said abutted flanges together.

3. The fan case assembly of claim 1 further comprising:
   a plurality of apertures passing through said first outer ring, wherein gap is defined between at least two of said plurality of leaves such that said plurality of apertures are exposed after said leaves have been slid over said outer surface.

4. The fan case assembly of claim 1 wherein said first and second outer rings are formed from different materials.

5. The fan case assembly of claim 4 wherein said first outer ring is formed from metal and said second outer ring is formed from a composite of materials.

6. The fan case assembly of claim 1 wherein one of said first outer ring and said second outer ring defines a piloting feature such that said first and second outer rings are guided into engagement as said leaves are sliding over said outer surface.

7. The fan case assembly of claim 1 wherein said second outer ring and said plurality of leaves are integrally formed with respect to one another.

8. The fan case assembly of claim 1 further comprising:
   first and second projections extending outward from a radially outer surface of said second outer ring, said first projection spaced from said first outer ring along said axis and said second projection overlapping said first outer ring along said axis.

9. The fan case assembly of claim 8 further comprising:
   a blanket positioned between said first and second projections such that at least a portion of said blanket overlaps said first outer ring along said axis.

10. The fan case assembly of claim 1 wherein said second outer ring and each of said plurality of leaves define respective radial thicknesses between a radially inner surface and a radially outer surface and wherein said radial thickness of said second outer ring and said radial thickness of said plurality of leaves are substantially similar.

11. The fan case assembly of claim 1 wherein said annular flange of said first outer ring is fixedly mounted to a frame support structure.

12. The fan case assembly of claim 1 wherein said first and second outer rings each include an inner surface extending axially and positioned adjacent to one another to define a substantially continuous flow path wall for guiding fluid flow.

13. The fan case assembly of claim 1 wherein said second outer ring is engaged in abutment against a forward-most end of said first outer ring.

14. A method for suspending a fan case comprising the steps of:
   forming a fan case with a ring portion centered on an axis for encircling a fan and with a plurality of leaves that extend away from the ring portion along the axis;
   sliding the plurality of leaves over a second ring until the ring portion and the second ring abut one another along the axis such that the fan case is cantilevered off the second ring, the second ring including an outer surface extending along the axis and defining an axial side of the second ring;
   engaging the plurality of leaves in abutment against the outer surface of the second ring; and
   mounting the plurality of leaves to the axial side of the second ring.

15. The method of claim 14 further comprising the step of:
   affixing the ring portion and the second ring together through flanges defined by the second ring and the plurality of leaves.

16. The method of claim 14 further comprising the step of:
   forming at least one gap about the axis between at least two of the plurality of leaves.

17. The method of claim 14 further comprising the steps of:
   encircling the fan case with a blanket; and
   positioning the blanket along the axis such that the blanket at least partially overlaps the second ring.

18. The method of claim 14 further comprising the steps of:
   abutting the second ring and the fan case against one another along the axis; and
   mounting the plurality of leaves to an axial side of the second ring remote from the ring portion.

19. The method of claim 14 wherein the first and second outer rings each include an inner surface extending axially and defining a substantially continuous flow path wall for guiding fluid flow.

20. The method of claim 14 wherein the ring portion of the fan case is engaged in abutment against a forward-most end of the second ring.

21. A turbine engine comprising:
   a front frame having an inner ring and a first outer ring encircling an axis, with a plurality of struts each extending radially outward from an inner end engaged with said inner ring to an outer end engaged with said first outer ring, wherein said first outer ring includes an annular flange for mounting;
   a fan case having a second outer ring centered on said axis and a plurality of leaves that extend away from said second outer ring along said axis, wherein said leaves being slid over an outer surface of said first outer ring to engage said first and second outer rings together; and
   wherein said first outer ring includes an outer surface extending along said axis and defining an axial side of said first outer ring; and
   wherein said plurality of leaves are engaged in abutment against said outer surface of said first outer ring and are mounted to said axial side of said first outer ring.

22. The turbine engine of claim 21 wherein at least one of said leaves includes a flange partially extending around said axis and abutting said annular flange of said first outer ring after said leaves have been slid over said outer surface.

23. The turbine engine of claim 22 further comprising:
at least one passageway extending through one or more of said plurality of struts, said at least one passageway including an opening defined by said first outer ring; and
a gap defined between at least two of said plurality of leaves such that said opening of said at least one passageway is exposed after said leaves have been slid over said outer surface.

24. The turbine engine of claim 23 wherein said first and second outer rings abut one another along said axis and cooperate to define a substantially continuous radially inner surface for guiding fluid flow.

25. The turbine engine of claim 24 further comprising:
a blanket encircling said second outer ring and positioned along said axis such that said blanket at least partially overlaps both said first and second outer rings.

26. The turbine engine of claim 21 wherein said annular flange of said first outer ring is fixedly mounted to a frame support structure and wherein said front frame and said fan case are positioned forward of a compressor section of the turbine engine.

27. The turbine engine of claim 21 wherein said second outer ring is engaged in abutment against a forward-most end of said first outer ring.

28. The turbine engine of claim 21 wherein said annular flange of said first outer ring is fixedly mounted to a frame support structure.

* * * * *